US010997464B2

(12) United States Patent
Yang et al.

(10) Patent No.: US 10,997,464 B2
(45) Date of Patent: May 4, 2021

(54) DIGITAL IMAGE LAYOUT TRAINING USING WIREFRAME RENDERING WITHIN A GENERATIVE ADVERSARIAL NETWORK (GAN) SYSTEM

(71) Applicant: Adobe Inc., San Jose, CA (US)

(72) Inventors: Jimei Yang, Mountain View, CA (US); Jianming Zhang, Campbell, CA (US); Aaron Phillip Hertzmann, San Francisco, CA (US); Jianan Li, Changchun (CN)

(73) Assignee: Adobe Inc., San Jose, CA (US)

( * ) Notice: Subject to any disclaimer, the term of this patent is extended or adjusted under 35 U.S.C. 154(b) by 265 days.

(21) Appl. No.: 16/186,382

(22) Filed: Nov. 9, 2018

(65) Prior Publication Data

US 2020/0151508 A1    May 14, 2020

(51) Int. Cl.
| | |
|---|---|
| *G06K 9/00* | (2006.01) |
| *G06K 9/62* | (2006.01) |
| *G06T 11/60* | (2006.01) |
| *G06T 9/00* | (2006.01) |
| *G06K 9/72* | (2006.01) |

(52) U.S. Cl.
CPC ......... *G06K 9/6257* (2013.01); *G06K 9/6202* (2013.01); *G06K 9/6255* (2013.01); *G06K 9/6268* (2013.01); *G06T 11/60* (2013.01); *G06K 9/726* (2013.01); *G06T 9/001* (2013.01); *G06T 9/002* (2013.01)

(58) Field of Classification Search
CPC .. G06K 9/6257; G06K 9/6202; G06K 9/6255; G06K 9/6268; G06K 9/726; G06T 11/60; G06T 9/001; G06T 9/002
USPC ........................................................ 382/157
See application file for complete search history.

(56) References Cited

U.S. PATENT DOCUMENTS

| | | | |
|---|---|---|---|
| 10,210,631 B1 * | 2/2019 | Cinnamon | G06T 11/003 |
| 10,762,337 B2 * | 9/2020 | Sharma | G06K 9/56 |
| 10,783,688 B2 * | 9/2020 | Walters | G06N 3/084 |
| 10,825,219 B2 * | 11/2020 | Fu | G06T 11/60 |
| 10,832,734 B2 * | 11/2020 | Baughman | H04N 21/251 |
| 10,846,889 B2 * | 11/2020 | Phogat | G06T 7/90 |

OTHER PUBLICATIONS

Li, Jianan, et al. "LayoutGAN: Generating Graphic Layouts with Wireframe Discriminators." International Conference on Learning Representations. 2018. (Year: 2018).*

(Continued)

*Primary Examiner* — Jonathan S Lee
(74) *Attorney, Agent, or Firm* — FIG. 1 Patents

(57) ABSTRACT

Digital image layout training is described using wireframe rendering within a generative adversarial network (GAN) system. A GAN system is employed to train the generator module to refine digital image layouts. To do so, a wireframe rendering discriminator module rasterizes a refined digital training digital image layout received from a generator module into a wireframe digital image layout. The wireframe digital image layout is then compared with at least one ground truth digital image layout using a loss function as part of machine learning by the wireframe discriminator module. The generator module is then trained by backpropagating a result of the comparison.

20 Claims, 11 Drawing Sheets

(56) References Cited

OTHER PUBLICATIONS

Nguyen, Tam, et al. "Deep learning UI design patterns of mobile apps." 2018 IEEE/ACM 40th International Conference on Software Engineering: New Ideas and Emerging Technologies Results (ICSE-NIER). IEEE, 2018. (Year: 2018).*
Abadi,"TensorFlow: Large-Scale Machine Learning on Heterogeneous Distributed Systems", Mar. 16, 2016, 19 pages.
Achlioptas,"Learning Representations and Generative Models for 3D Point Clouds", Jun. 12, 2018, 18 pages.
Bahdanau,"Neural Machine Translation by Jointly Learning to Align and Translate", In Journal of Computing Research Repository, Sep. 2014, 14 pages.
Bylinskii,"Learning Visual Importance for Graphic Designs and Data Visualizations", Aug. 8, 2017, 13 pages.
Deka,"Rico: A Mobile App Dataset for Building Data-Driven Design Applications", Oct. 2017, pp. 845-854.
Donahue,"Long-term Recurrent Convolutional Networks for Visual Recognition and Description", Feb. 17, 2015, pp. 2625-2634.
Fan,"A Point Set Generation Network for 3D Object Reconstruction from a Single Image", Dec. 7, 2016, 12 pages.
Fisher,"Example-based Synthesis of 3D Object Arrangements", Nov. 1, 2012, 11 pages.
Graves,"Neural Turing Machines", Dec. 10, 2014, 26 pages.
Hurst,"Review of Automatic Document Formatting", Sep. 18, 2009, 10 pages.
Johnson,"DenseCap: Fully Convolutional Localization Networks for Dense Captioning", Nov. 24, 2015, 10 pages.
Karras,"Progressive Growing of GANs for Improved Quality, Stability, and Variation", Feb. 26, 2018, 26 pages.
Kingma,"Adam: A Method for Stochastic Optimization", Dec. 22, 2014, 9 pages.
Kipf,"Semi-Supervised Classification with Graph Convolutional Networks", Feb. 22, 2017, 14 pages.
Merrell,"Interactive Furniture Layout Using Interior Design Guidelines", ACM Trans. Graph. 30, Aug. 2011, 9 pages.
O'Donovan,"Color Compatibility From Large Datasets", ACM Transactions on Graphics (Proc. SIGGRAPH) 30, 4, 63, Aug. 7, 2011, 12 pages.
O'Donovan,"DesignScape: Design with Interactive Layout Suggestions", Apr. 18, 2015, 4 pages.
O'Donovan,"Exploratory Font Selection Using Crowdsourced Attributes", ACM Transactions on Graphics, Jul. 27, 2014, 9 pages.
O'Donovan,"Learning Layouts for Single-Page Graphic Designs", Aug. 2014, 14 pages.
Pang,"Directing User Attention via Visual Flow on Web Designs", Nov. 2016, 11 pages.
Qi,"PointNet: Deep Learning on Point Sets for 3D Classification and Segmentation", Apr. 10, 2017, 19 pages.
Radford,"Unsupervised Representation Learning with Deep Convolutional Generative Adversarial Networks", ICLR 2016, Jan. 7, 2016, 16 pages.
Reed,"Neural Programmer-Interpreters", Feb. 29, 2016, 13 pages.
Salimans,"Improved Techniques for Training GANs", In Advances in Neural Information Processing Systems, Jun. 10, 2016, 10 pages.
Song,"Semantic Scene Completion from a Single Depth Image", Nov. 28, 2016, 14 pages.
Sutskever,"Sequence to Sequence Learning with Neural Networks", in Advances in neural information processing systems, 2014., Dec. 14, 2014, 9 pages.
Swearngin,"Rewire: Interface Design Assistance from Examples", Apr. 24, 2018, 12 pages.
Van"Conditional Image Generation with PixelCNN Decoders", Jun. 18, 2016, 13 pages.
Van"Wavenet: A Generative Model for Raw Audio", Sep. 19, 2016, 15 pages.
Vinyals,"Order Matters: Sequence to Sequence for Sets", Feb. 23, 2016, 11 pages.
Vondrick,"Generating Videos with Scene Dynamics", Oct. 26, 2016, 10 pages.
Wang,"Deep Convolutional Priors for Indoor Scene Synthesis", May 2018, 14 pages.
Wang,"Non-local Neural Networks", Apr. 13, 2018, 10 pages.
Wu,"Learning a Probabilistic Latent Space of Object Shapes via 3D Generative-Adversarial Modeling", Jan. 4, 2017, 11 pages.
Yan,"Perspective Transformer Nets: Learning Single-View 3D Object Reconstruction without 3D Supervision", Aug. 13, 2017, 15 pages.
Yang,"Learning to Extract Semantic Structure from Documents Using Multimodal Fully Convolutional Neural Networks", Jun. 7, 2017, 16 pages.
Zitnick,"Bringing Semantics Into Focus Using Visual Abstraction", Jun. 2013, pp. 3009-3016.

* cited by examiner

DIGITAL IMAGE LAYOUT TRAINING USING WIREFRAME RENDERING WITHIN A GENERATIVE ADVERSARIAL NETWORK (GAN) SYSTEM

BACKGROUND

Digital content creation systems are implemented by computing devices to support creation of a wide range of digital content, such as book covers, webpages, magazine pages, blogs, digital marketing content, and so forth. To do so, digital content creation systems support inclusion and arrangement of a variety of graphic elements together as a digital image layout. For example, blocks of text, vector graphics, digital images, representations of executable functionality (e.g., media players, gifs), banners, advertisements, and so forth may be arranged together to form a digital image layout for a webpage.

Conventional techniques used to generate digital image layouts, however, rely on manual user interaction to specify arrangement of the graphic elements. This is, in part, due to the difficultly in obtaining representations of data for digital image layouts that are suitable for training as part of machine learning. Although techniques have been developed to employ machine learning to generate natural-looking digital images, for instance, these techniques fail when confronted with digital image layouts. This is because the processing of digital images using conventional machine learning techniques is performed at a pixel (e.g., bitmap) level, which does not capture subtleties of design of digital image layouts.

A digital image layout, for example, may be formed using graphic elements that are scalable and that have a variety of different shapes, such as polygons, curves, and ellipses instead of pixels arranged on a regular lattice. A visually correct arrangement of these graphic elements within the digital image layout is a crucial factor in design of the digital image layout. This is because misalignment of two graphic elements by even a few millimeters may be readily apparent to a user and thus ruin an overall effect of the digital image layout. Directly working on parameters of graphic elements using conventional machine learning techniques is difficult to capture these subtleties and therefore training of such a machine learning model at a parameter level may not be sensitive enough to achieve accurate arrangement and layout styles. This causes conventional machine-learning techniques to fail when confronted with digital image layouts and thus require manual user interaction.

SUMMARY

Digital image layout training is described using wireframe rendering within a generative adversarial network (GAN) system. Generative adversarial network systems are a type of machine learning that employs a generator module and a discriminator module as implemented by a computing device. The generator module is configured to generate candidates which are then evaluated by the discriminator module, e.g., to determine whether the candidates are real or fake. A goal of the generator module is therefore to generate a candidate that is considered real by the discriminator module, e.g., through comparison to a ground truth. Accordingly, the generator module is trained as part of adversarial back-and-forth communication between the generative and discriminator modules in order to generate "real" candidates.

In the techniques described herein, the GAN system is employed to train the generator module to refine digital image layouts in a manner that is considered "real" by a discriminator module of the GAN system. To do so, the generator module of the GAN system receives a training digital image layout, and from this, generates a refined training digital image layout using machine learning, e.g., a neural network. The refined training digital image layout is then communicated to a wireframe rendering discriminator module to determine whether this layout is real or fake.

The wireframe rendering discriminator module is configured to rasterize the refined digital training digital image layout into a wireframe digital image layout. The wireframe digital image layout is then compared with at least one ground truth digital image layout using a loss function as part of machine learning by the wireframe discriminator module. Through use of the wireframe digital image layout, the wireframe rendering discriminator module may address spatial patterns of the graphic elements and thus is more sensitive to alignment over conventional pixel-based approaches. Also, the wireframe digital image layout may be used to readily identify overlap of graphic elements. The generator module is trained by backpropagating a result of the comparison, e.g., whether the training digital image layout is considered real or fake. In this way, the digital image layout may capture subtleties that are not apparent at a pixel level and thus train the generator module to refine digital image layouts automatically and without user intervention that are visually pleasing.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
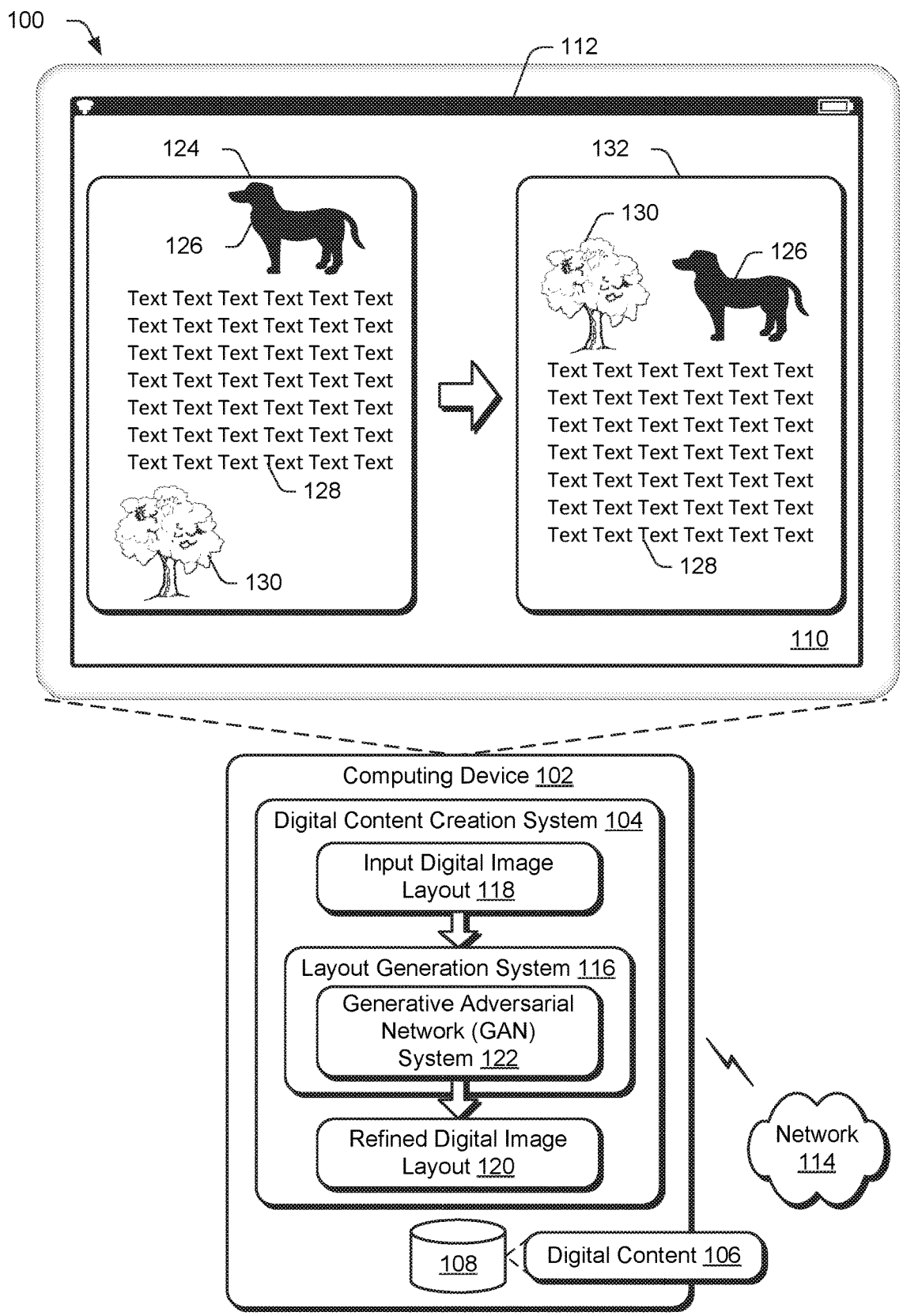
FIG. 1 is an illustration of a digital medium environment in an example implementation that is operable to employ digital image layout training techniques using wireframe rendering within a generative adversarial network (GAN) system.

Conventional digital content creation systems are limited to manual interaction in order to generate a digital image layout of graphic elements. This is due to the difficultly in obtaining representations of data for digital image layouts that are suitable for training as part of machine learning. Conventional techniques, for instance, process digital images at a pixel level, which do not capture subtleties of digital image layouts, e.g., overlaps and overall arrangements of graphic elements in relation to each other as part of the layout.

Accordingly, digital image layout training techniques and systems are described that leverage wireframe rendering within a generative adversarial network (GAN) system. Wireframe rendering enables the GAN system to address structure and arrangement of discrete graphic elements as part of training a neural network to generate digital image layouts, which is not possible in conventional pixel-based approaches. Generative adversarial network systems are a type of machine learning that employs a generator module and a discriminator module. The generator module is configured to generate candidates which are then evaluated by the discriminator module, e.g., to determine whether the candidates are real or fake. As a result, the discriminator module is used to train the generator module to generate candidates that the discriminator module "considers real" through an adversarial relationship.

In the techniques described herein, the GAN system is employed to train a neural network of a generator module to refine digital image layouts by leveraging wireframe rendering as part of the training. To do so, the generator module of the GAN system receives a training digital image layout. The training digital image layout, for instance, may be generated by an input generation module of a layout generation system, automatically and without user intervention, from a plurality of graphic elements having randomly sampled semantic parameters (e.g., identifying types of graphic elements such as text, digital image, and so on) and geometric parameters, e.g., size, shape, and so forth.

From this, the generator module generates a refined training digital image layout of the plurality of graphic elements using machine learning. To do so, the generator module generates feature data from the training digital image layout using an encoder of a machine-learning model, e.g., as part of a multilayer perceptron network. A stacked relation module is then employed as part of the machine learning to model semantic and spatial relationships from the semantic and geometric parameters. This modeled relationship is then used to refine the features of each graphic element in a coordinated manner with each other graphic element in the layout to generate the refined training digital image layout by the generator module.

The refined training digital image layout is communicated by the generator module as a candidate for evaluation by a wireframe rendering discriminator module as to whether the candidate is "real" or "fake." In this way, the wireframe rendering discriminator module is used to train the generator module to refine digital image layouts in a manner that is visually pleasing using GAN techniques as described above.

As part of this, the wireframe rendering discriminator module is configured to employ wireframe rendering to overcome the challenges of conventional pixel-based approaches that are not able to address arrangement and geometric parameters of graphic elements within digital image layouts. To do so, the wireframe rendering discriminator module rasterizes the refined training digital image layout to form a wireframe digital image layout such that the graphic elements are converted into two-dimensional wireframe images. The wireframe digital image layout is then compared with at least one ground truth digital image layout using a loss function as part of machine learning by the wireframe discriminator module. Through use of the wireframe digital images, the wireframe discriminator module is able to operate directly on geometric parameters (e.g., geometric structures) and positions of the graphic elements contained therein as part of training a neural network of the generator module, which is not possible using conventional pixel based approaches.

The wireframe discriminator module, for instance, may obtain a plurality of ground truth digital image layouts, i.e., a set of digital image layouts that are considered visually pleasing. These plurality of ground truth digital images layouts are also rasterized to form wireframes of graphic elements contained within the layouts. Based on a comparison of the wireframe digital image layout with the ground truth digital image layouts (e.g., wireframes of graphic elements contained within the layouts), the wireframe discriminator module determines whether the wireframe digital image layout is real or fake, e.g., by probability distributions of graphic elements exhibited by the ground truth digital image layouts. Through use of the wireframe digital image layout, the discriminator module may address spatial patterns, geometries, and alignments of the graphic elements with respect to each other through use of the wireframes that are not apparent in convention pixel-based approaches and thus is more sensitive to alignment over conventional pixel-based approaches. Also, the wireframe digital image layout may be used to readily identify overlap of graphic elements and thus alleviate use of dedicated operations by the network to infer occlusions that may occur.

The generator module is then trained by backpropagating a result of the comparison, e.g., whether the training digital image layout is considered real or fake. The wireframe rendering discriminator module, for instance, may employ a loss function to propagate data back to the generator module. This data is used to set and reset weights of nodes of a machine-learning model (e.g., neural network) employed by the generator module as part of machine learning to refine the digital image layout. In this way, the digital image layout may capture subtleties that are not apparent at a pixel level which limit accuracy of conventional techniques and thus train the generator module to refine digital image layouts automatically and without user intervention to be visually pleasing.

The generator module, once trained as part of the GAN system, is then configured to refine digital image layouts without the wireframe rendering discriminator module. The generator module, for instance, may receive an input digital image layout having graphic elements that are associated with semantic parameters (e.g., tags identifying a type of graphic element such as text, image, and so forth) and geometric parameters, e.g., shape, size, and so on. The digital image layout, for instance, may be specified as a collection of graphic elements without a set arrangement by a user.

The trained machine learning model (e.g., a convolutional based neural network) then generates a refined digital image layout, automatically and without user intervention, for the graphic elements based on semantic and geometric parameters. In this way, the layout generation system may generate digital image layouts in a visually pleasing manner that is not possible using conventional pixel-based approaches. Further discussion of these and other examples, including use of a relation-based discriminator module as part of the GAN system, is included in the following sections.

Terms

A "generative adversarial network" (GAN) system is a type of machine learning that employs a generator module and a discriminator module.

A "generator module" is configured to generate candidates, e.g., a refined training digital image layout from a training digital image layout using a neural network.

A "discriminator module" is configured to evaluate whether the candidates of the generator module are real or fake. As a result, the discriminator module is used to train the generator module to generate candidates that the wireframe rendering discriminator module "considers real" as part of back-and-forth communication between the generative and discriminator module, e.g., through backpropagation of data based on a loss function to update weights of nodes of a neural network that implements the generator module.

A "digital image layout" specifies an arrangement of graphic elements within an item of digital content. Examples of digital content that may be created based on a digital image layout includes webpages, composite digital images, blogs, book covers, digital marketing content, and so forth. Examples of graphic elements include text blocks, digital images, vector graphics, illustrations, representations of executable functionality (e.g., controls of a digital media player), and so forth.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ digital image layout training techniques using wireframe rendering within a generative adversarial network (GAN) system. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 11.

The computing device 102 is illustrated as including a digital content creation system 104. The digital content creation system 104 is implemented at least partially in hardware of the computing device 102 to process and transform digital content 106 (e.g., webpages, digital images, digital marketing content, and so on), which is illustrated as maintained in storage 108 of the computing device 102. Such processing includes creation of the digital content 106, modification of the digital content 106, and rendering of the digital content 106 in a user interface 110 for output, e.g., by a display device 112. Although illustrated as implemented locally at the computing device 102, functionality of the digital content creation system 104 may also be implemented as whole or part via functionality available via the network 114, such as part of a web service or "in the cloud."

An example of functionality incorporated by the digital content creation system 104 is illustrated as a layout generation system 116. The layout generation system 116 is configured to receive an input digital image layout 118 having graphic elements, and from this, generate a refined digital image layout 120 using machine learning by specifying an arrangement of the graphic elements, one to another. An example 124 of the input digital image layout 118 is illustrated as displayed within the user interface 110 by the display device 112. The illustrated example 124 includes a variety of graphic elements, such as a digital image 126 of a dog, a text block 128, a vector graphic 130 of a tree, and so forth. Each of these graphic elements are associated with a semantic parameter (e.g., a tag identifying a type of the graphic element such as text, image, illustration, and so forth) and a geometric parameter, e.g., indicating size, shape, and so forth.

The layout generation system 116 then generates a refined digital image layout 120 that is visually pleasing by determining an arrangement of the graphic elements in relation to each other based on the semantic and geometric parameters using machine learning. An example 132 of a refined digital image layout 120 is illustrated in which the vector graphic 130 and the digital image 126 are arranged next to each other horizontally and above the text block 128 to form a visually pleasing layout, which is performed automatically and without user intervention by the layout generation system 116.

As previously described, conventional machine learning techniques are incapable of generating a digital image layout that is visually pleasing. This is because conventional techniques operate at a pixel level and thus experience difficulties in obtaining representations of data for digital image layouts that are suitable for training as part of machine learning. As a result, conventional machine learning techniques are incapable of addressing subtleties of digital image layouts, e.g., overlaps and overall arrangements of graphic elements in relation to each other as part of the layout, geometries of the graphic elements, semantic parameters of the graphic elements, and so on.

In the techniques described herein, however, a generative adversarial network (GAN) system 122 is employed to address these challenges by directly extracting relations between different graphic elements in a parameter space (e.g., semantic and geometric parameters) in order to optimize a layout, e.g., at a vector graphic level as opposed to a pixel level of conventional techniques. In this way, the GAN system 122 may address spatial patterns and geometries of the graphic elements and thus has increased sensitivity to alignment over conventional pixel-based approaches. Also, the GAN system 122 may be used to readily identify overlap of graphic elements and thus alleviate the network from performing dedicated operations to infer occlusions that may occur, and thus has increased computational efficiency. Further discussion of these and other examples is included in the following section and shown in corresponding figures.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Digital Image Layout Machine-Learning Training

Figure 2:
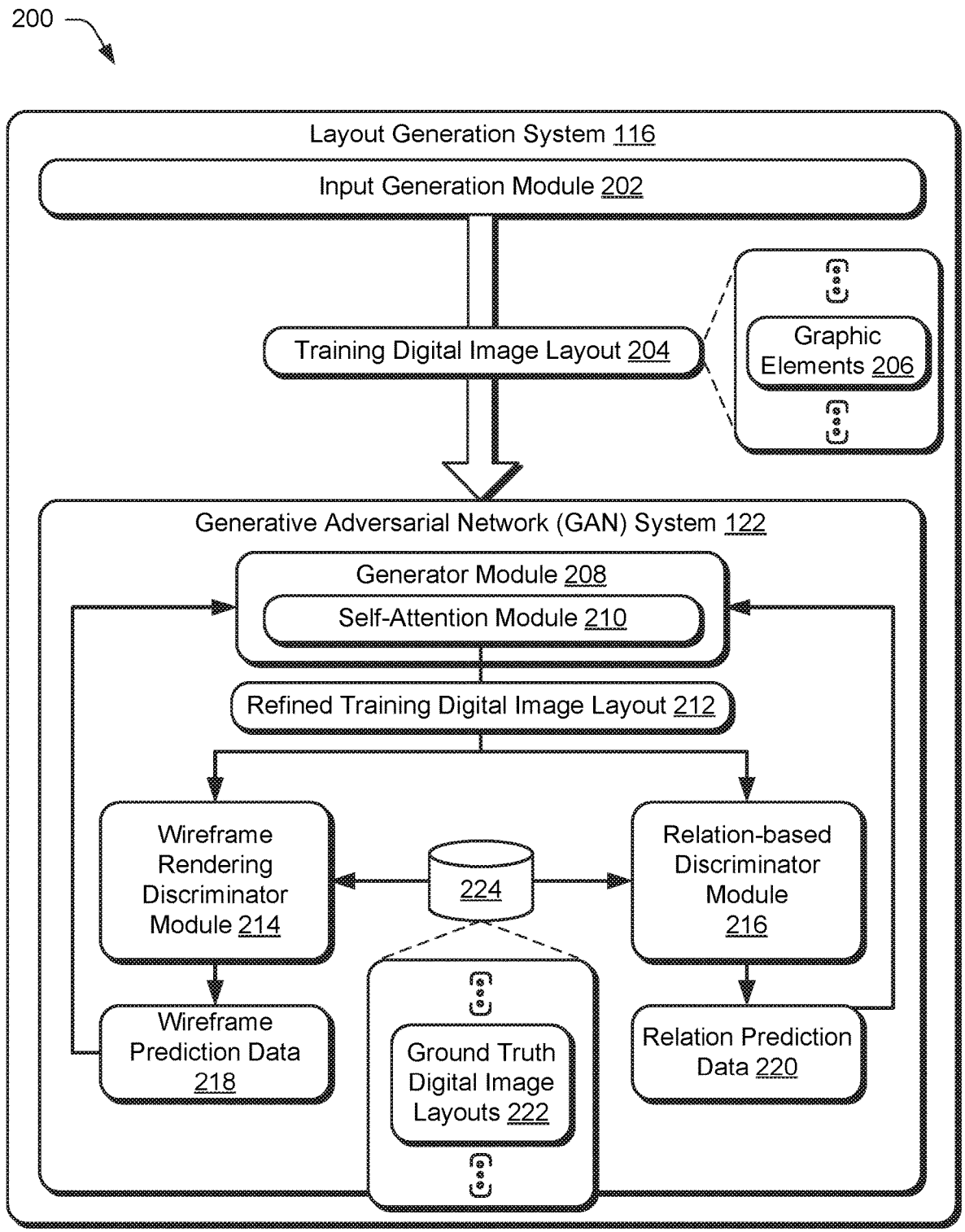
FIG. 2 depicts a system in an example implementation showing operation of a generative adversarial network system of FIG. 1 in greater detail as performing machine-learning training for digital image layout refinement.
Figure 3:
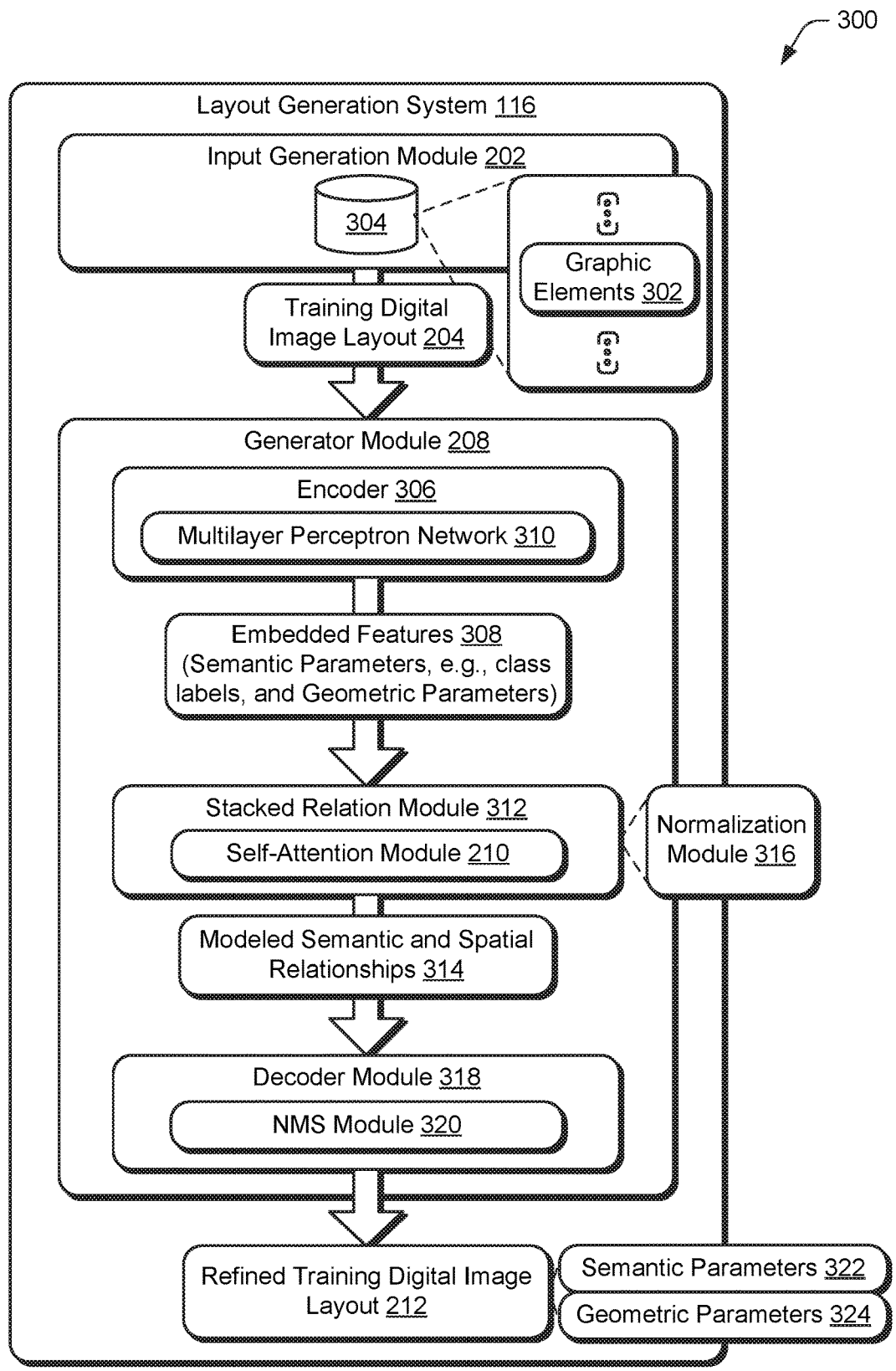
FIG. 3 depicts a system in an example implementation showing operation of a generator module of FIG. 2 to generate a refined training digital image layout from a training digital image layout using machine learning.
Figure 4:
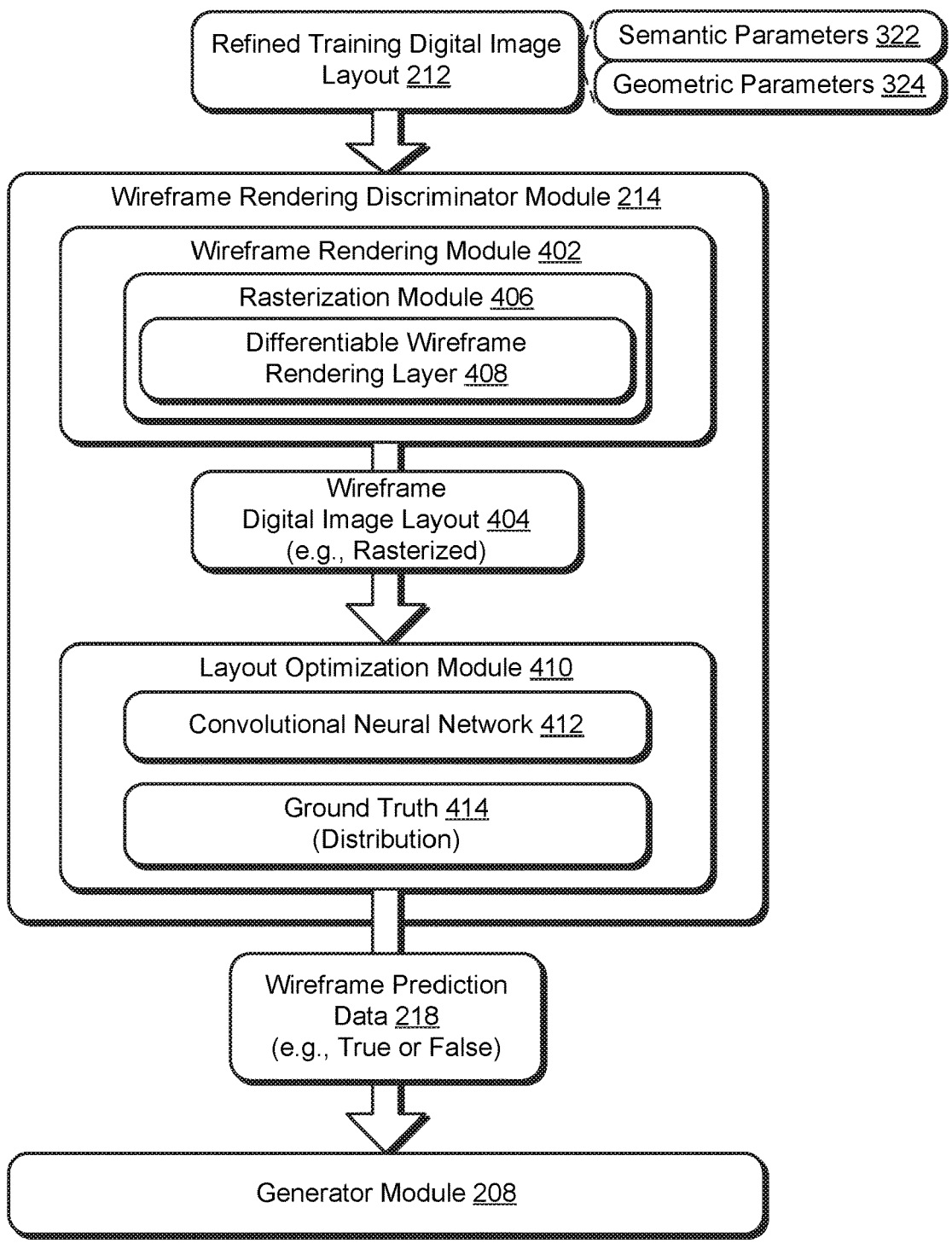
FIG. 4 depicts a system in an example implementation showing operation of a wireframe rendering discriminator module of FIG. 2 to generate wireframe prediction data based on the refined training digital image layout using machine learning to train the generator module.
Figure 5:
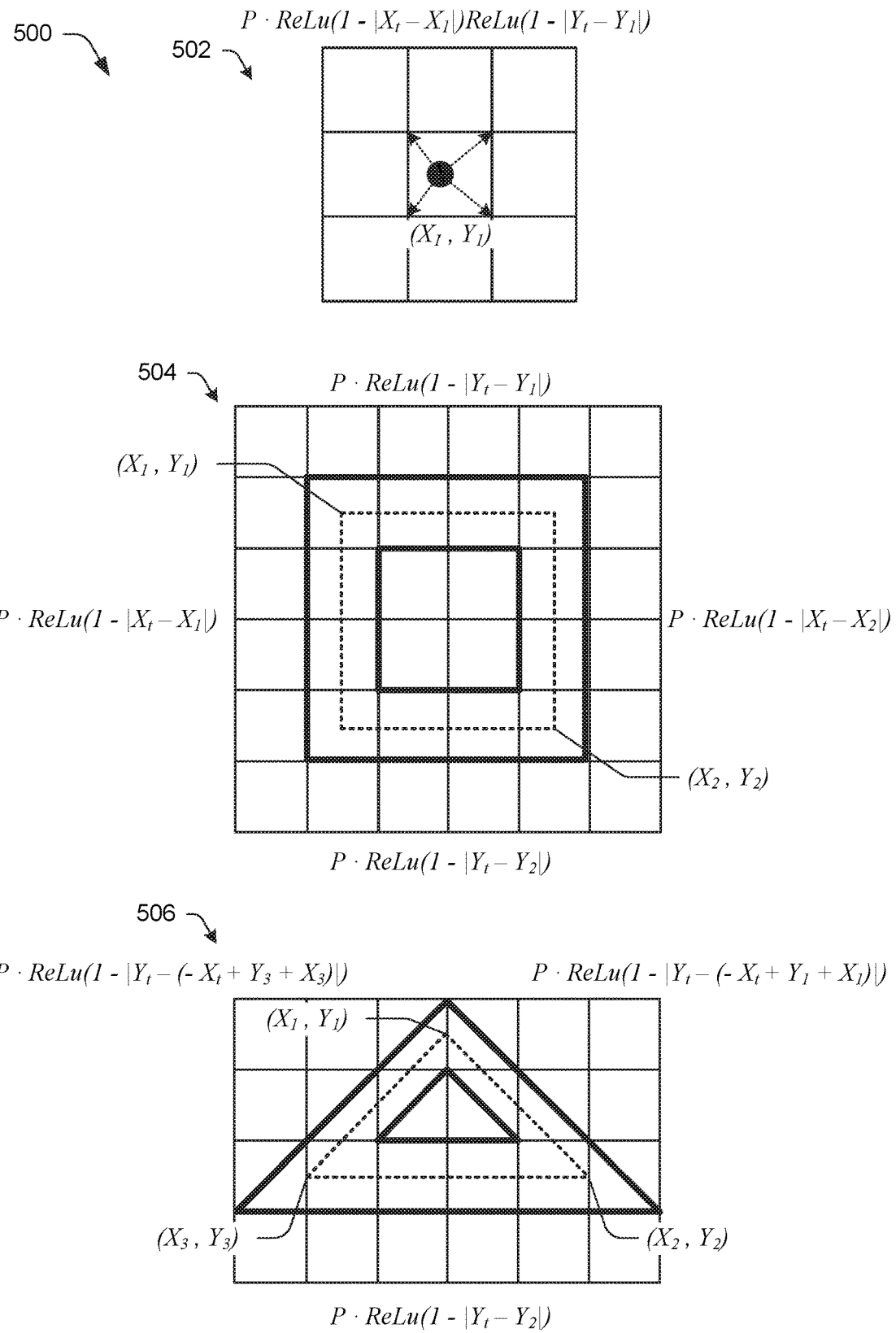
FIG. 5 depicts an example implementation showing examples of wireframe rendering of graphic elements.
Figure 6:
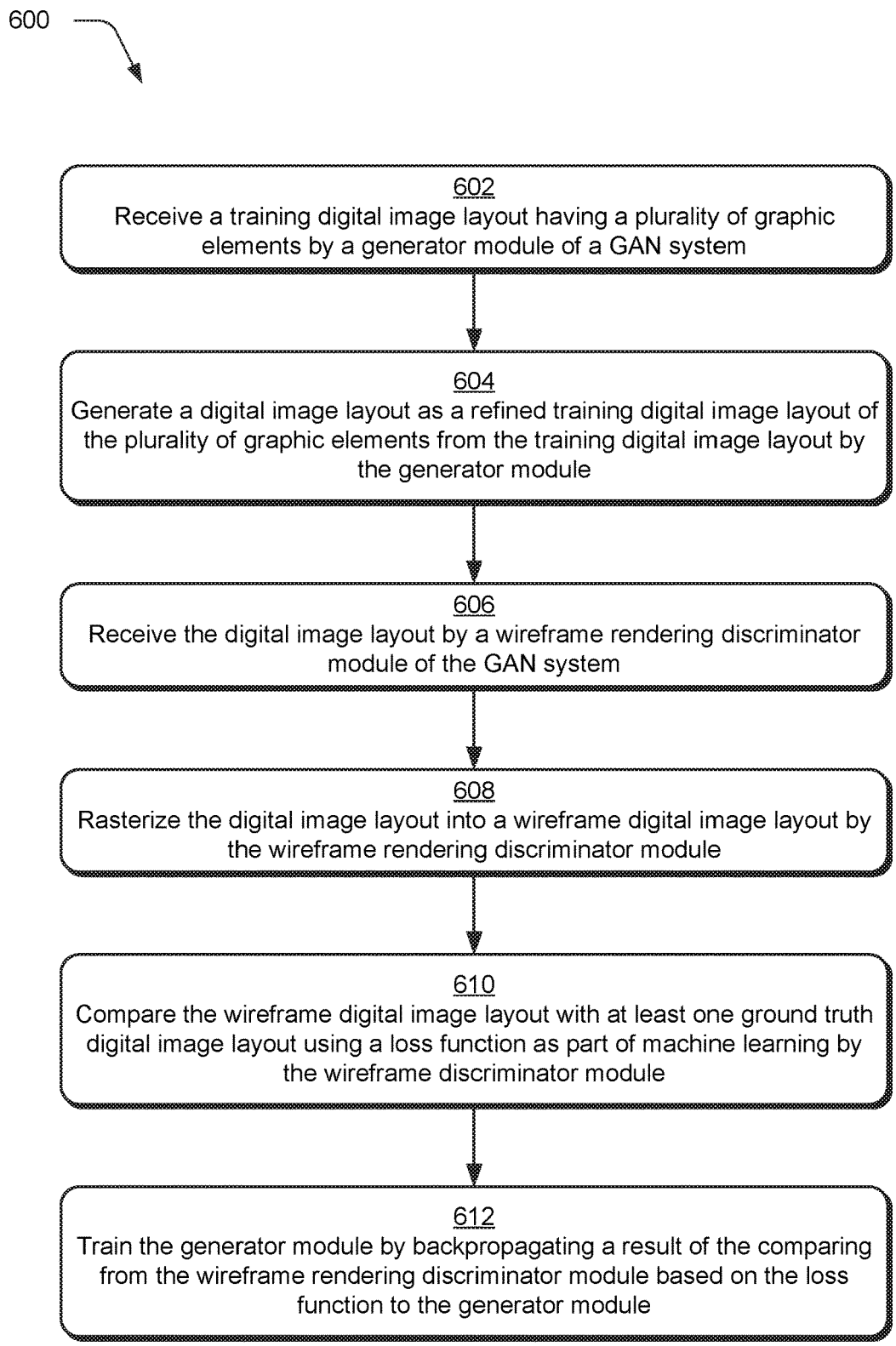
FIG. 6 is a flow diagram depicting a procedure in an example implementation in which a wireframe digital image layout is generated by rasterizing a refined training digital image layout received from a generator module by a wireframe rendering discriminator module to train the generator module using machine learning as part of a GAN system.

FIG. 2 depicts a system 200 in an example implementation showing operation of the generative adversarial network system 122 of FIG. 1 in greater detail as performing machine-learning training for digital image layout refinement. FIG. 3 depicts a system 300 in an example implementation showing operation of a generator module of FIG. 2 to generate a refined training digital image layout from a training digital image layout using machine learning. FIG. 4 depicts a system 400 in an example implementation showing operation of a wireframe rendering discriminator module of FIG. 2 to generate wireframe prediction data based on the refined training digital image layout using machine learning to train the generator module. FIG. 5 depicts an example implementation showing examples of wireframe rendering of graphic elements. FIG. 6 depicts a procedure 600 in an example implementation in which a wireframe digital image layout is generated by rasterizing a refined training digital image layout received from a generator module by a wireframe rendering discriminator module to train the generator module using machine learning as part of a GAN system.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-6 as well as to FIGS. 7-8 which describe use of a relation-based discriminator module and FIGS. 9-10 which describe use of the trained generator module.

FIG. 2 describe an example 200 of an overall architecture of the generative adversarial network system 122 as part of the layout generation system 116. The layout generation system 116 includes an input generation module 202 that is configured to generate training digital image layouts 204 automatically and without user intervention that includes a plurality of graphic elements 206. The graphic elements 206, for instance, may be selected from a storage system based on a variety of parameters, including semantic and geometric parameters, which are then incorporated into a single training digital image layout 204 that is to be refined by a generator module and trained using a discriminator module as part of a generative adversarial network system 122.

The generative adversarial network system 122 employs a type of machine learning that includes a generator module and a discriminator module as implemented by a computing device. The generator module is configured to generate candidates which are then evaluated by the discriminator module, e.g., to determine whether the candidates are real or fake. A goal of the generator module is therefore to generate a candidate that is considered real by the discriminator module, e.g., through comparison to a ground truth. Accordingly, the generator module is trained as part of adversarial back-and-forth communication between the generative and discriminator modules in order to generate "real" candidates.

In the illustrated example, the generative adversarial network (GAN) system 122 includes a generator module 208 having a self-attention module 210. The self-attention module 210 is configured to generate the refined training digital image layout 212 from the training digital image layout 204 through group relational modeling of graphic elements 206 included in the layout as further described in relation to FIG. 3.

The GAN system 122 also includes two discriminator modules in this example. The first discriminator module is a wireframe rendering discriminator module 214 that is configured to optimize the refined training digital image in a visual domain using wireframes. The wireframe rendering discriminator module 214 first rasterizes the refined training digital image layout 212 into a wireframe digital image layout.

A neural network (e.g., a convolutional neural network) is then used to optimize a layout through comparison with ground truth digital image layouts 222 selected from a storage device 224, e.g., through comparison with distributions of graphic elements taken from these layouts. From this comparison, the wireframe rendering discriminator module 214 generate wireframe prediction data 218 indicating whether the refined training digital image layout 212 is considered "real" or "fake" as part of a loss function. The wireframe prediction data 218 is then used to train the generator module 208, e.g., set weights of nodes of a neural network, as further described in relation to FIG. 4.

The second discriminator module is a relation-based discriminator module 216 to optimize the refined training digital image layout 212 in a parameter domain, e.g., semantic and geometric parameters. The relation-based discriminator module 216, for instance, may embed graphic elements of the refined training digital image layout 212 (e.g., generate features) using machine learning. From this, the relation-based discriminator module 216 generates relation prediction data 220 indicating whether the refined training digital image layout 212 is considered "real" or "fake" as part of a loss function. The relation prediction data 220 is also used to train the generator module 208 (e.g., set weights of nodes of a neural network) as further described in relation to FIG. 5.

FIG. 3 depicts a system 300 in an example implementation showing operation of a generator module 208 of FIG. 2 to generate a refined training digital image layout 212 from a training digital image layout 204 using machine learning. The training digital image layout 204 is generated automatically and without user intervention in this example by an input generation module 202. The input generation module 202 is configured to select graphic elements 302 from a storage device 304. This selection may be performed in a variety of ways, such as based on semantic parameters (e.g., class labels identifying a type of graphic element such as text block, digital image, etc.) and/or geometric parameters, e.g., size and shape. In an example implementation, the semantic parameters are sampled using a uniform distribution and the geometric parameters are selected using a Gaussian distribution by the input generation module 202.

The training digital image layout 204, once generated by the input generation module 202 to include the plurality of graphic elements, is then received by the generator module 208 of the GAN system 122 (block 602). The generator module 208 is configured to generate the refined training digital image layout 212 from the training digital image layout 204 through group relational modeling of graphic elements 206.

To do so in the illustrated example, an encoder 306 takes as an input the graphic elements 302 with random semantic parameters (e.g., class labels) and geometric parameters sampled from Uniform and Gaussian distributions, respectively, from the input generation module 202. The encoder 306 is configured to embed semantic and geometric parameters of each graphic element in the training digital image layout 204.

In one example, the encoder 306 utilizes a multilayer perceptron network 310 implemented as multiple fully connected layers to generate the embedded features 308. A multilayer perceptron (MLP) network 310 is a type of feedforward neural network that includes at least three layers of nodes, e.g., an input layer, a hidden layer and an output layer. Except for the input nodes, each node is a neuron that uses a nonlinear activation function and utilizes a supervised learning technique (e.g., backpropagation) for training. The multiple layers and non-linear activation distinguish MLP from a linear perceptron network, and as such, can distinguish data that is not linearly separable.

A stacked relation module 312 implemented as self-attention module 210 is then used to refine the embedded features 308 of each graphic element contextually by modeling its semantic and spatial relationships 314 with each other elements graphic element 302 in the training digital image layout 204. The self-attention module 210, for instance, may be implemented using a non-local operation that computes a response at a position as a weighted sum of the features at all positions. An example of a self-attention module 210 is further described in "Non-local neural networks," Xiaolong Wang, Ross Girshick, Abhinav Gupta, and Kaiming He, arXiv preprint arXiv:1711.07971, 2017, the entire disclosure of which is incorporated by reference.

Denote $f(p_i, \theta_i)$ as the embedded feature of the graphic element i, its refined feature representation $f'(p_i, \theta_i)$ can be obtained through a contextual residual learning process, which is defined as:

$$f'(p_i, \theta_i) = W_r \frac{1}{N} \sum_{\forall j} H(f(p_i, \theta_i), f(p_j, \theta_j)) U(f(p_j, \theta_j)) + f(p_i, \theta_i).$$

Here j is the element index and the unary function U computes a representation of the embedded feature $f(p_j, \theta_j)$ of element j. The pairwise function H computes a scalar value representing the relation between elements i and j. Thus, each of the other elements $j \neq i$ contribute to the feature refinement of element i by summing up corresponding relationships. The response may be normalized by a total number of elements in the set, N. The weight matrix $W_r$ computes a linear embedding, producing the contextual residual to be added on $f(p_i, \theta_i)$ for feature refinement. In one example, H is defined as a dot-product as follows:

$$H(f(p_i,\theta_i),f(p_j,\theta_j))=\delta(f(p_i,\theta_i))^T \phi(f(p_j,\theta_j)),$$

where $\delta(f(p_i,\theta_i))=W_\delta f(p_i,\theta_i)$ and $\phi(f(p_j,\theta_j))=W_\phi f(p_j,\theta_j)$ are two linear embeddings. In an implementation, T=4 relation modules are stacked and thus form the stacked relation module 312 for feature refinement.

Next, a decoder module 318 is used to map the refined feature of each graphic element back to respective semantic parameters 322 and geometric parameters 324 in order to generate the refined training digital image layout 212. The decoder module 318, for instance, may also be implemented as another multilayer perceptron network followed by two branches of fully connected layers with sigmoid activation. A non-maximum suppression (NMS) module 320 may also be employed by the decoder module 318 to remove duplicated graphical elements. Thus, at this point in the discussion the layout generation system 116 has generated a candidate as the refined training digital image layout 212 for processing by discriminator modules as part of the generative adversarial network (GAN) system 122.

As previously described, in a GAN system 122 a discriminator is used to distinguish between synthetic layouts generated by the generator module 208 and real layouts, e.g., ground truths. In the system 200 of FIG. 2, two approaches are leveraged from visual and graphic domains respectively. For the visual domain solution, denoted as the wireframe rendering discriminator module 214, a differentiable wireframe rendering layer maps graphic elements to two-dimensional wireframe images, thus convolutional networks are applied to optimize the layout from a visual domain. In contrast, the graphic domain solution, denoted as the relation-based discriminator module 216, directly extracts the relations between different graphic elements in the parameter space for layout optimization.

FIG. 4 depicts a system 400 in an example implementation showing operation of a wireframe rendering discriminator module 214 of FIG. 2 to generate wireframe prediction data 218 based on the refined training digital image layout 212 using machine learning to train the generator module. The refined digital image layout 212 is received by a wireframe rendering module 402 of the wireframe rendering discriminator module 214 of the GAN system 122 (block 606) from the generator module 208.

The refined digital image layout 212 is rasterized by a rasterization module 406 into a wireframe digital image layout 404 of the the wireframe rendering discriminator module (block 608), e.g., to form two-dimensional wireframe rendering of graphic elements in the refined training digital image layout 212. The wireframe digital image layout 404 is then compared with at least one ground truth digital image layout 414 using a loss function as part of machine learning by a layout optimization module 410 of the wireframe discriminator module (block 610). The layout optimization module 410, for instance, may select a set of random samples from real data maintained in a storage device as a ground truth 414 and employ a convolutional neural network 412 to recognize a distribution exhibited by the ground truth 414. From this, wireframe prediction data 218 is generated (e.g., "real" or "fake", i.e., "true" or "false") using a loss function and backpropagated to train the generator module 208 (block 612).

To take advantage of convolutional networks to learn visual patterns for efficient layout optimization, one issue is to map graphic elements to 2-D images in a differentiable way, which is a process of rasterization. A graphic layout with N graphic elements is to be rasterized (denoted as $\{(p_i,\theta_i), \ldots, (p_N,\theta_N)\}$) onto a target image $I(X^t,Y^t)$ layout, where $(X^t,Y^t)$ is the location in a pre-defined regular grid. Assuming there are C semantic classes for each element, the target image I is thus of C channels. The pixel $I(X^t,Y^t)$ at the location $(X^t,Y^t)$ in the rendered image may be calculated through class-wise maximum operation of the rendered class probability distribution on $(X^t,Y^t)$ of each graphic element, generally formulated as:

$$I(X^t, Y^t) = \max_{i=1,\ldots,N} R((p_i, \theta_i), (X^t, Y^T))$$

where $R((p_i,\theta_i),(X^t,Y^t))$ denotes the rendering process as:

$$R((p_i,\theta_i),(X^t,Y^t))=p_i \cdot F((X^t,Y^t),\theta_i),$$

where the function F computes the rasterization, which varies for different geometric forms of graphic elements. In the following discussion, polygons $\theta_i=(X_i^1,Y_i^1,X_i^2, Y_i^2, \ldots, X_i^K,Y_i^K)$ have K keypoints.

Starting with the simplest geometric form, a single keypoint $\theta_i=(X_i^1,Y_i^1))$ for element i, an interpolation kernel k is implemented for its rasterization. Its spatial rendering response on $(X^t,Y^t)$ in the rendered image can be written as:

$$F((X^t,Y^t),(X_i^1,Y_i^1))=k(X^t-X_i^1)k(Y^t-Y_i^1).$$

Bilinear interpretation is adopted, corresponding to the kernel $k(d)=\max(0,1-|d|)$ (implemented as ReLU activation), as shown in the example implementation 500 of a first example 502 of FIG. 5. As $R((p_i,\theta_i),(X^t,Y^t))$ is a linear function of the class probability distribution and the coordinates, gradients can be propagated backward for each of them.

Now consider more complex polygons in the second and third examples 504, 506. Assuming an element is a rectangle as shown in the second example 504 504, or bounding box represented by its top-left and bottom-right coordinates $\theta=(X^1,Y^1,X^2,Y^2)$, which is common in various designs. Specifically, considering a rectangle i with coordinates $(X_i^1, Y_i^1, X_i^2, Y_i^2)$, as shown in the second example, the black grids represent the locations in the rendered image and the dotted box represents the rectangle being rasterized on the rendered image. For a wireframe representation, only the points near the boundary of the dotted box (lie in the solid line) are related to the rectangle, so its spatial rendering response on $(X_t,Y_t)$ can be formulated as:

$$F((X^t, Y^t), (X_i^1, Y_i^1, X_i^2, Y_i^2)) = \max \begin{pmatrix} k(X^t - X_i^1)b(Y^t - Y_i^1)b(Y_i^2 - Y^t), \\ k(X^t - X_i^2)b(Y^t - Y_i^1)b(Y_i^2 - Y^t), \\ k(Y^t - Y_i^1)b(X^t - X_i^1)b(X_i^2 - X^t), \\ k(Y^t - Y_i^2)b(X^t - X_i^1)b(X_i^2 - X^t) \end{pmatrix}$$

where $b(d)=\min(\max(0,d),1)$ constraining the rendering to nearby pixels.

In the third example 506, a wireframe rendering process is shown of another geometric form, e.g., a triangle. For triangle i represented by its three vertices' coordinates $\theta_i=(X_i^1,Y_i^1,X_i^2,Y_i^2,X_i^3,Y_i^3)$, its spatial rendering response on $(X^t,Y^t)$ in the rendered image may be calculated as:

$$F((X^t, Y^t), (X_i^1, Y_i^1, X_i^2, Y_i^2, X_i^3, Y_i^3)) =$$

$$\max \begin{pmatrix} k\left(Y^t - \frac{(Y_i^2 - Y_i^1) \cdot (X^t - X_i^1)}{X_i^2 - X_i^1} - Y_i^1\right) b(X^t - X_i^1)b(X_i^2 - X^t), \\ k\left(Y^t - \frac{(Y_i^3 - Y_i^1) \cdot (X^t - X_i^1)}{X_i^3 - X_i^1} - Y_i^1\right) b(X^t - X_i^3)b(X_i^1 - X^t), \\ k\left(Y^t - \frac{(Y_i^3 - Y_i^2) \cdot (X^t - X_i^2)}{X_i^3 - X_i^2} - Y_i^2\right) b(X^t - X_i^3)b(X_i^2 - X^t) \end{pmatrix}$$

Through this wireframe rendering process, gradients can be propagated backward to both the semantic parameters (e.g., class probabilities) and geometric parameters of the graphic elements for joint optimization. A CNN 412 having three convolutional layers followed by a fully connected layer with sigmoid activation is then used for predicting fake/real graphical layout by the layout optimization module 410. Thus, the wireframe rendering discriminator module 214 supports a visual domain solution in which a differentiable wireframe rendering layer is implemented to map graphic elements to two-dimensional wireframe images. The convolutional neural networks 412 are applied to optimize the layout from a visual domain. In contrast, the graphic domain solution, denoted as the relation-based discriminator module 216, directly extracts the relations between different graphic elements in the parameter space for layout optimization as further described in the following discussion.

Figure 7:
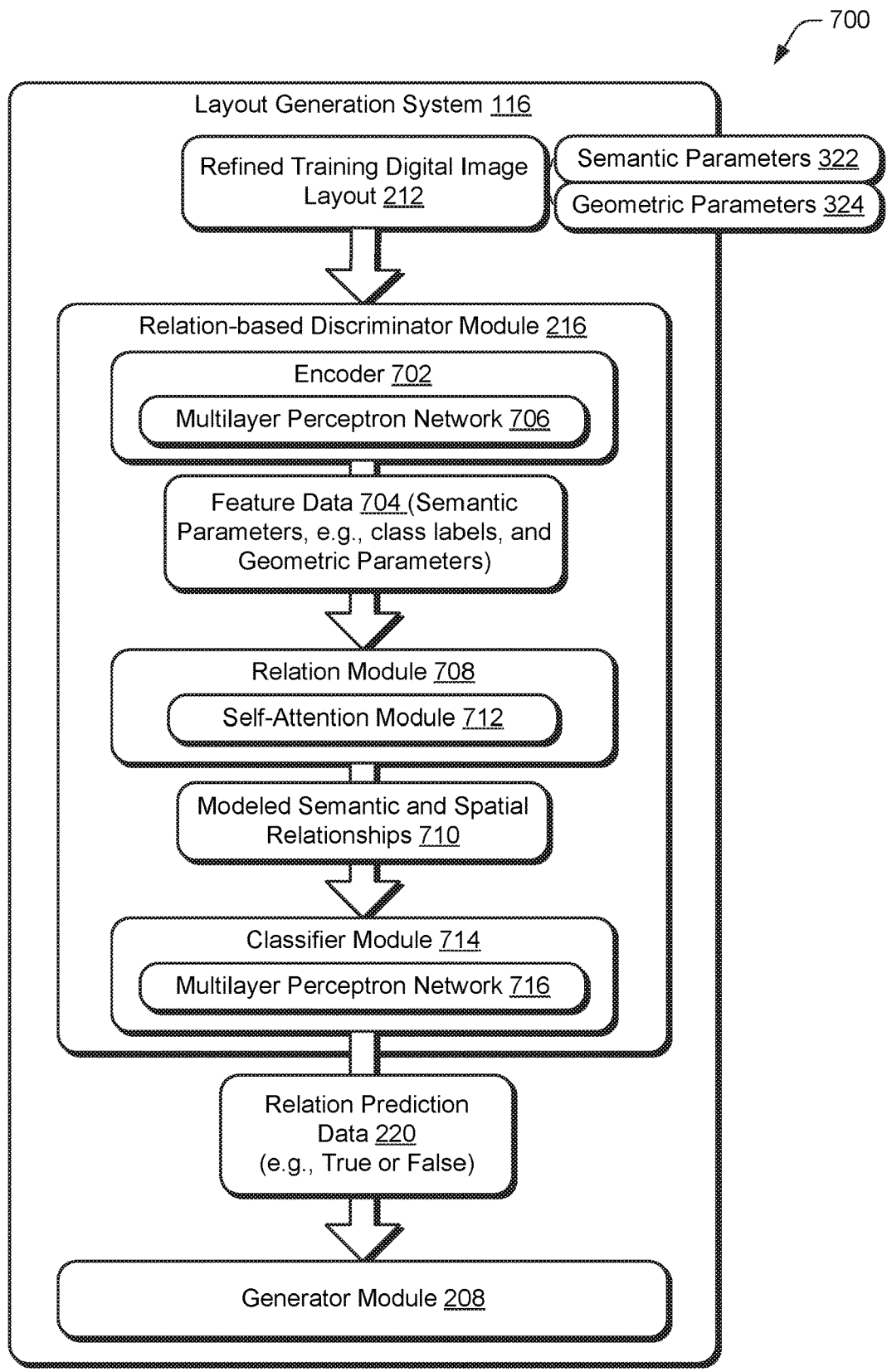
FIG. 7 depicts a system in an example implementation showing operation of a relation-based discriminator module of FIG. 2 to generate relation prediction data based on the refined training digital image layout using machine learning to train the generator module.
Figure 8:
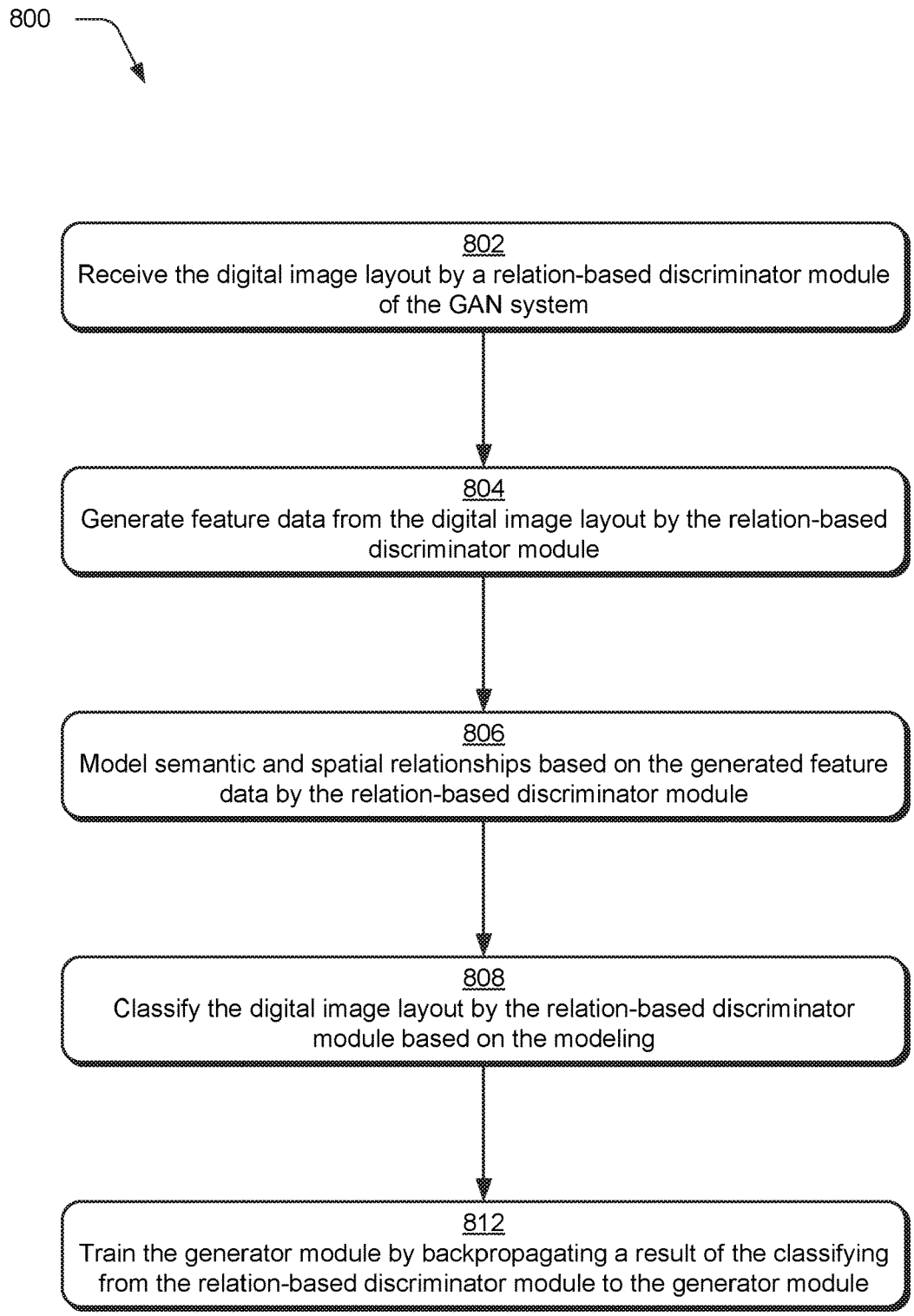
FIG. 8 is a flow diagram depicting a procedure in an example implementation of use of a relation-based discriminator module of the GAN system to train a generator module.

FIG. 7 depicts a system 700 in an example implementation showing operation of a relation-based discriminator module of FIG. 2 to generate relation prediction data based on the refined training digital image layout using machine learning to train the generator module 208. FIG. 8 depicts a procedure 800 in an example implementation of use of a relation-based discriminator module of the GAN system to train a generator module.

The relation-based discriminator module 216 is configured to optimize the refined training digital image layout 212 within a graphic domain. To do so, the relation-based discriminator module 216 of the GAN system 122 takes as an input the refined training digital image layout 212 including a set of graphic elements represented by semantic parameters 322 (e.g., class probability distributions) and geometric parameters 314 (block 802).

An encoder 702 is used to generate feature data 704 (block 804), e.g., using a multilayer perceptron network 706 for feature embedding $f(p_i, \theta_i)$ as previously described. A relation module 708 is then employed to model semantic and spatial relationships 710 based on the generated feature data 704 (block 806) by the relation-based discriminator module 216.

The modeled semantic and spatial relationships 710, for instance, extract a global graphical relationship among different graphic elements $g(r(p_1, \theta_1), \ldots, f'(p_N, \theta_N))$ where $r(p_i, \theta_i)$ is the same as the stacked relation module 312 in the generator module 208 but without a residual connection, and g is a max-pooling function. Thus, the global relationship among each the graphic elements within the refined training digital image layout 212 is modeled. Upon which, a classifier module 714 is applied that also includes a multilayer perception network 716 with sigmoid activation to generate the relation predication data 220, e.g., fake/real prediction which is then also used to train the generator module 208. In this way, two discriminators may be employed as part of the GAN system 122 to train the generator module 208.

Figure 9:
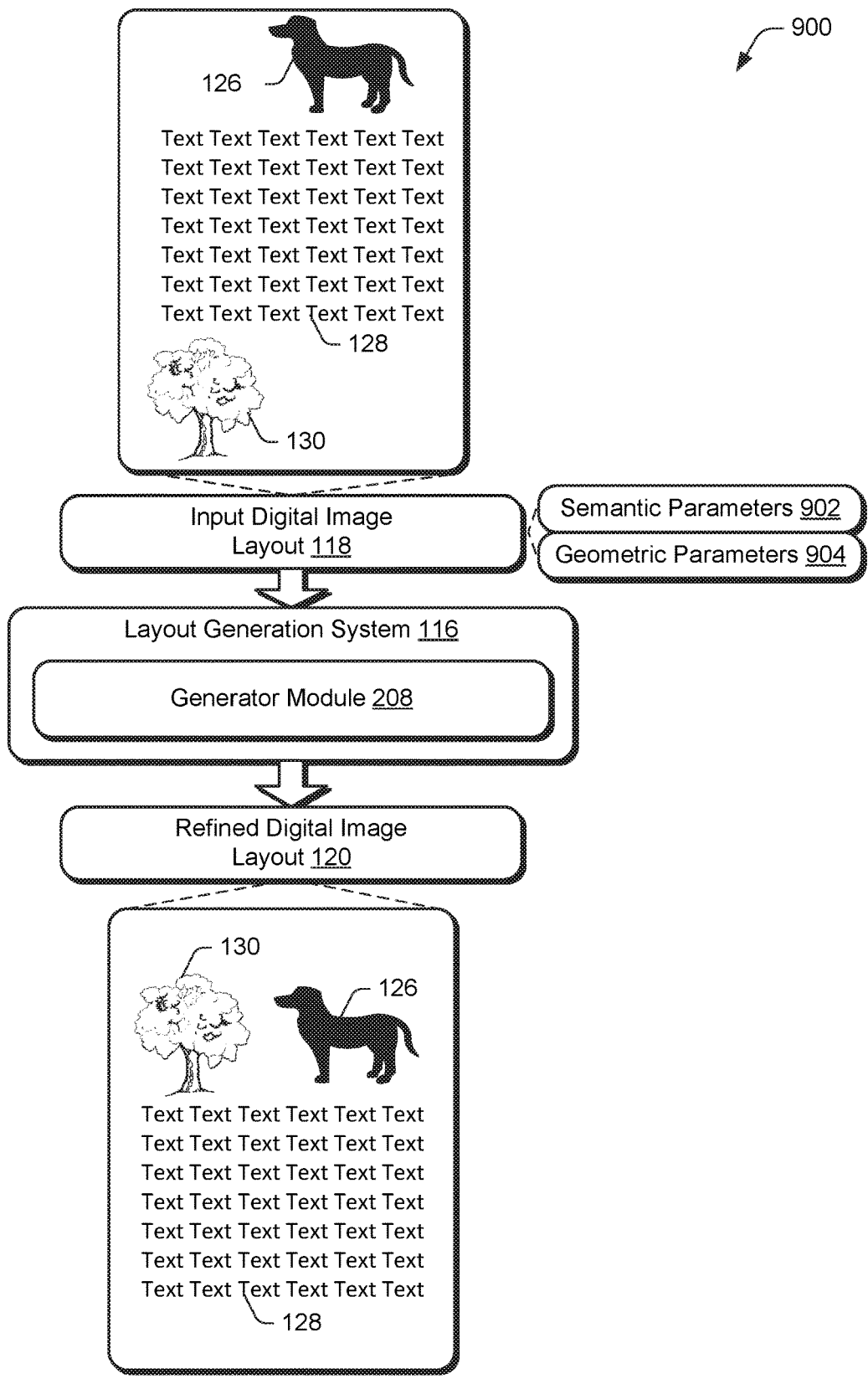
FIG. 9 depicts a system in an example implementation in which a generator module trained as part of a GAN network receives an input digital image layout, and from this, generates a refined digital image layout.
Figure 10:
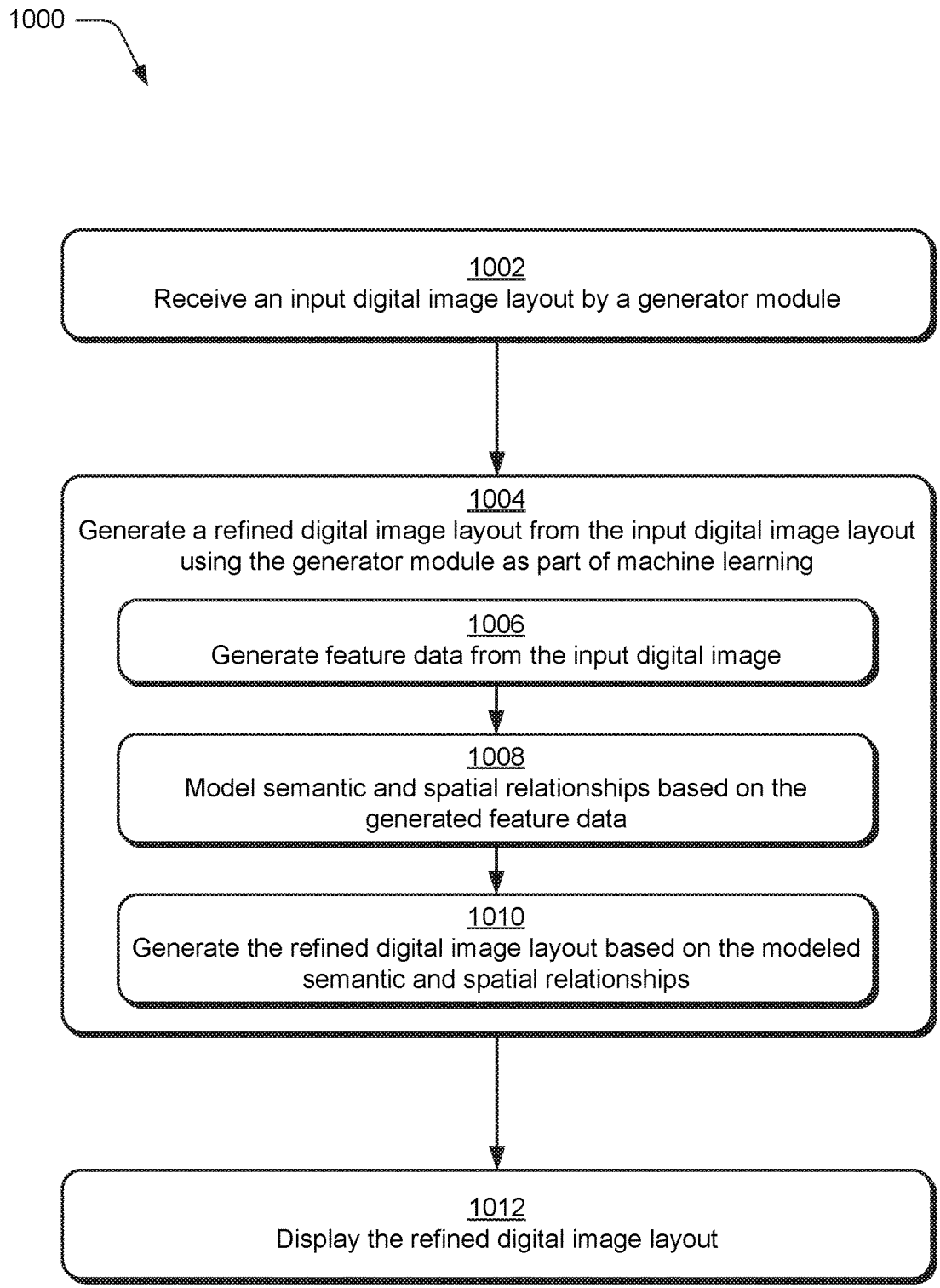
FIG. 10 is a flow diagram depicting a procedure in an example implementation in which an input digital image layout is used to generate a refined digital image layout by a generator module that is trained using wireframe rendering within a generative adversarial network (GAN) system.

FIG. 9 depicts a system 900 in an example implementation in which a generator module 208 trained as part of a GAN network 122 receives an input digital image layout 118, and from this, generates a refined digital image layout 120. FIG. 10 depicts a procedure 1000 in an example implementation in which an input digital image layout is used to generate a refined digital image layout by a generator module that is trained using wireframe rendering within a generative adversarial network (GAN) system 122. The process of use of the trained generator module 208 is similar to that used to generate candidates to train the generator module 208, but does not employ the discriminators of the GAN system 122. As such, the generator module 208 in this example employs the encoder 306, stacked relation module 312 and self-attention module 210, as well as a decoder module 318 trained as described in relation to FIGS. 3-8.

An input digital image layout 118 is received by the generator module 208 (block 1002) having semantic and geometric parameters 902, 904. The input digital image layout 118, for instance, may include a set of graphic elements specified via a user input in no particular arrangement, which are then arranged to generate the refined digital image layout 120 by the generator module 208 using machine learning (block 1004). To do so, feature data is generated from the input digital image (block 1006). Semantic and spatial relationships are modeled based on the generated feature data (block 1008). The refined digital image layout 120 is then generated based on the modeled semantic and spatial relationships (block 1010), which is then displayed (block 1012). In this way, the generator module 208, once trained, may generate the refined digital image layout 120 automatically and without user intervention for a set of graphic elements, which is not possible using conventional pixel-based approaches.

Example System and Device

Figure 11:
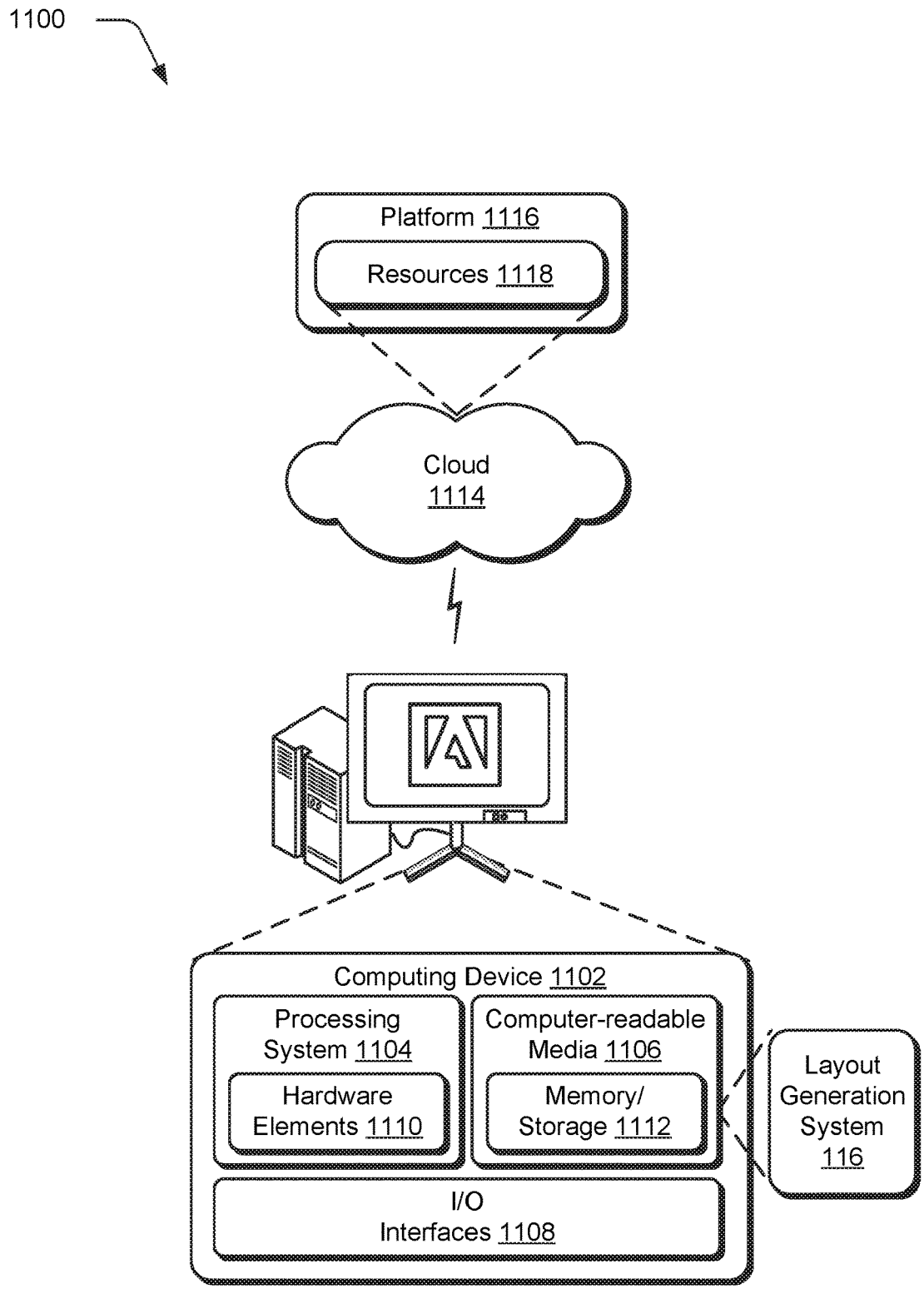
FIG. 11 illustrates an example system including various components of an example device that can be implemented as any type of computing device as described and/or utilize with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the layout generation system 116. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium digital image layout environment, a method implemented by at least one computing device, the method comprising:
   generating, by the at least one computing device, a digital image layout that includes a plurality of graphic elements by a generator module of a generative adversarial network (GAN) system;
   rasterizing, by the at least one computing device, the digital image layout into a wireframe digital image layout by a wireframe rendering discriminator module of the GAN system;

comparing, by the at least one computing device, the wireframe digital image layout with at least one ground truth digital image layout using a loss function as a part of machine learning by the wireframe rendering discriminator module; and training, by the at least one computing device, the generator module by backpropagating a result of the comparing from the wireframe rendering discriminator module based on the loss function to the generator module.

2. The method as described in claim 1, further comprising:

generating, by the at least one computing device, feature data from the digital image layout by a relation-based discriminator module of the generative adversarial network (GAN) system;

modeling, by the at least one computing device, semantic and spatial relationships based on the generated feature data by the relation-based discriminator module; and classifying, by the at least one computing device, the digital image layout based on the modeling by the relation-based discriminator module, and wherein the training of the generator module is further based on backpropagating a result of the classifying from the relation-based discriminator module to the generator module.

3. The method as described in claim 2, wherein the feature data includes semantic parameters and geometric parameters.

4. The method as described in claim 2, wherein the wireframe rendering discriminator module is based on an image domain and the relation-based discriminator module is based on geometric parameters and position of the plurality of graphic elements.

5. The method as described in claim 2, wherein the result of the classifying from the relation-based discriminator module indicates whether the digital image layout is real or fake and the result from the wireframe rendering discriminator module indicates whether the digital image layout is real or fake.

6. The method as described in claim 1, further comprising:

receiving, by the at least one computing device, a training digital image layout by the generator module; and generating, by the at least one computing device, the digital image layout as a refined training digital image layout of the plurality of graphic elements from the training digital image layout by the generator module.

7. The method as described in claim 1, further comprising:

receiving, by the at least one computing device, an input digital image layout by the trained generator module; and generating, by the at least one computing device, a refined digital image layout from the input digital image layout by the trained generator module.

8. The method as described in claim 1, wherein the wireframe rendering discriminator module operates at a vector graphic level for the plurality of graphic elements in the digital image layout and not at a pixel level.

9. In a digital medium digital image layout environment, a generative adversarial network (GAN) system including:

a generator module implemented by at least one computing device to receive a training digital image layout, and from which, generate a refined training digital image layout using machine learning; and a wireframe rendering discriminator module implemented by the at least one computing device, the wireframe rending discriminator module including:

a rasterization module to rasterize the refined training digital image layout into a wireframe digital image layout;

a layout optimization module to optimize the rasterized digital image layout using a convolutional neural network (CNN) and a loss function and train the generator module by backpropagating a result of the optimization based on the loss function to the generator module.

10. The system as described in claim 9, further comprising a relation-based discriminator module implemented by the at least one computing device, the relation-based discriminator module including:

an encoder to generate feature data from the refined training digital image layout;

a relation module to model semantic and spatial relationships based on the generated feature data; and a classifier module to classify the refined digital image layout based on the modeling and train the generator module based on backpropagating a result of the classifying.

11. The system as described in claim 10, wherein the feature data includes semantic parameters and geometric parameters.

12. The system as described in claim 10, wherein the result of the classifying from the relation-based discriminator module indicates whether the refined training digital image layout is real or fake and the result from the wireframe rendering discriminator module indicates whether the refined training digital image layout is real or fake.

13. The system as described in claim 9, wherein the generator module includes:

an encoder to generate feature data from the training digital image layout;

a relation module to model semantic and spatial relationships based on the generated feature data; and a decoder module to generate the refined training digital image layout from the training digital image layout based on the modeled semantic and spatial relationships.

14. The system as described in claim 9, wherein the generator module, once trained, is configured to receive an input digital image layout and generate a refined digital image layout from the input digital image layout.

15. The system as described in claim 9, wherein the wireframe rendering discriminator module operates at a vector graphic level for graphic elements in the refined training digital image layout and not at a pixel level.

16. In a digital medium digital image layout environment, a system comprising:

means for receiving an input digital image layout including a plurality of graphic elements having respective semantic parameters and geometric parameters; and means for generating a refined digital image layout from the input digital image layout using a generator module as part of machine learning, the generator module trained as part of a generative adversarial network (GAN) using a wireframe rendering discriminator module including:

means for rasterizing a training digital image layout into a wireframe digital image layout;

means for optimizing the rasterized digital image layout using a convolutional neural network (CNN) and a loss function; and means for training the generator module by backpropagating a result of the optimization based on the loss function to the generator module.

17. The system as described in claim 16, wherein the generator module is further trained as part of the generative adversarial network (GAN) using a relation-based discriminator module implemented including:
  means for generating feature data from the training digital image layout;
  means for modeling semantic and spatial relationships based on the generated feature data; and
  means for classifying the training digital image layout based on the modeling and train the generator module based on backpropagating a result of the classifying.

18. The system as described in claim 17, wherein the feature data includes semantic parameters and geometric parameters.

19. The system as described in claim 17, wherein the result of the classifying indicates whether the training digital image layout is real or fake and the result from the wireframe rendering discriminator module indicates whether the training digital image layout is real or fake.

20. The system as described in claim 16, wherein the generator module includes:
  means for generating feature data from the input digital image layout;
  means for modeling semantic and spatial relationships based on the generated feature data using a convolutional neural network; and
  means for generating the refined digital image layout based on the modeled semantic and spatial relationships.

* * * * *